United States Patent
Min et al.

(10) Patent No.: US 11,531,824 B2
(45) Date of Patent: Dec. 20, 2022

(54) CROSS-LINGUAL INFORMATION RETRIEVAL AND INFORMATION EXTRACTION

(71) Applicant: Raytheon BBN Technologies Corp., Cambridge, MA (US)

(72) Inventors: Bonan Min, Cambridge, MA (US); Rabih Zbib, Arlington, MA (US); Zhongqiang Huang, Winchester, MA (US)

(73) Assignee: Raytheon BBN Technologies Corp., Cambridge, MA (US)

( * ) Notice: Subject to any disclaimer, the term of this patent is extended or adjusted under 35 U.S.C. 154(b) by 189 days.

(21) Appl. No.: 16/415,988

(22) Filed: May 17, 2019

(65) Prior Publication Data

US 2020/0364307 A1    Nov. 19, 2020

(51) Int. Cl.
*G06F 17/00*    (2019.01)
*G06F 40/58*    (2020.01)
(Continued)

(52) U.S. Cl.
CPC ........ *G06F 40/58* (2020.01); *G06F 16/24578* (2019.01); *G06F 16/90332* (2019.01); *G06N 3/08* (2013.01); *G06N 20/00* (2019.01)

(58) Field of Classification Search
CPC .............. G06F 40/284; G06F 16/3344; G06F 40/295; G06F 16/3329; G06F 16/90332;
(Continued)

(56) References Cited

U.S. PATENT DOCUMENTS

2008/0086363 A1    4/2008  Kass et al.
2011/0137636 A1    6/2011  Srihari et al.
(Continued)

FOREIGN PATENT DOCUMENTS

WO    WO-2020236483 A1    11/2020

OTHER PUBLICATIONS

"International Application Serial No. PCT/US2020/032645, International Search Report dated Jul. 29, 2020", 4 pgs.
(Continued)

*Primary Examiner* — Michael Ortiz-Sanchez
(74) *Attorney, Agent, or Firm* — Schwegman Lundberg & Woessner, P.A.

(57) ABSTRACT

A machine accesses a query in a first natural language. The machine identifies an event corresponding to the query. The machine computes, using a cross-lingual information retrieval module, a ranked list of documents in a second natural language that are related to the event. At least a portion of documents in the ranked list are selected from a collection of documents in the second natural language that are not annotated with events. The cross-lingual information retrieval module is trained using a dataset comprising annotated documents in the first natural language and translations of the annotated documents into the second natural language. Each annotated document is annotated with one or more events. The machine provides an output representing at least a portion of the ranked list of documents in the second natural language. The second natural language is different from the first natural language.

17 Claims, 11 Drawing Sheets

(51) Int. Cl.
  *G06F 16/9032* (2019.01)
  *G06N 20/00* (2019.01)
  *G06F 16/2457* (2019.01)
  *G06N 3/08* (2006.01)
(58) Field of Classification Search
  CPC .... G06F 40/279; G06F 40/58; G06F 16/3337; G06F 16/338; G06F 40/44; G06F 40/216; G06F 16/243; G06F 16/3338; G06F 40/55; G06F 40/51; G06F 40/169; G06F 40/45; G06F 40/40; G06F 40/47; G06F 16/334; G06F 16/33; G06F 16/35; G06F 16/24578; G06F 40/30; G06F 40/10; G06F 40/20; G06F 40/263; G06F 16/10; G06F 16/30; G06F 16/20; G06F 16/22; G06F 3/167; G06F 16/9535; G06F 16/3322; G06F 3/017; G06F 16/367; G06F 16/951; G06F 40/205; G06F 40/289; G06F 40/35; G06F 16/2425; G06F 16/24575; G06F 16/345; G06F 16/9024; G06F 16/90324; G06F 1/3206; G06F 21/32; G06F 3/013; G06F 40/16; G06F 40/253; G06F 13/1673; G06F 16/2228; G06F 16/2393; G06F 16/2423; G06F 16/24522; G06F 16/248; G06F 16/256; G06F 16/27; G06F 16/3334; G06F 16/374; G06F 16/90328; G06F 16/93; G06F 16/9536; G06F 1/1632; G06F 21/34; G06F 21/575; G06F 2200/1636; G06F 3/011; G06F 3/0346; G06F 3/041; G06F 3/061; G06F 3/0656; G06F 3/0683; G06F 40/126; G06F 40/242; G06F 9/485; G06F 9/4881; G06F 9/547; G06F 11/3684; G06F 11/3688; G06F 12/0246; G06F 12/0253; G06F 13/1668; G06F 16/214; G06F 16/2272; G06F 16/2428; G06F 16/245; G06F 16/24526; G06F 16/24542; G06F 16/24545; G06F 16/2549; G06F 16/283; G06F 16/322; G06F 16/3331; G06F 16/63; G06F 16/9032; G06F 16/90335; G06F 16/904; G06F 16/9532; G06F 16/9574; G06F 17/16; G06F 1/324; G06F 1/325; G06F 1/3287; G06F 1/329; G06F 1/3293; G06F 1/3296; G06F 21/6245; G06F 2203/04101; G06F 2212/214; G06F 2212/7201; G06F 2212/7211; G06F 3/044; G06F 3/048; G06F 3/0481; G06F 3/0488; G06F 3/06; G06F 3/162; G06F 3/165; G06F 40/211; G06F 40/226; G06F 40/237; G06F 40/268; G06F 40/274; G06F 7/24; G06F 9/4418; G06F 9/54; G06F 9/541; G10L 15/1822; G10L 15/1815; G10L 15/22; G10L 2015/223; G10L 2015/088; G10L 15/30; G10L 15/08; G10L 15/26; G10L 13/00; G10L 15/16; G10L 2015/227; G10L 15/32; G10L 17/22; G10L 2021/02166; G10L 25/48; G10L 25/78; G10L 13/08; G10L 15/005; G10L 15/063; G10L 15/18; G10L 15/285; G10L 2015/025; G10L 15/07; G10L 15/25; G10L 17/00; G10L 2015/228; G10L 21/0208; G10L 25/03; G10L 13/02; G10L 154/00; G10L 15/02; G10L 15/05; G10L 15/183; G10L 15/187; G10L 15/19; G10L 15/197; G10L 15/20; G10L 17/24; G10L 19/008; G10L 2015/0635; G10L 2015/0636; G10L 2015/225; G10L 21/028; G10L 25/18; G10L 25/27; G10L 25/30; G10L 25/51; G10L 25/84; G06N 20/00; G06N 3/08
  See application file for complete search history.

(56) References Cited

U.S. PATENT DOCUMENTS

| | | | |
|---|---|---|---|
| 2014/0337005 A1* | 11/2014 | Abdel-Hady | G06F 16/35 704/2 |
| 2015/0112963 A1 | 4/2015 | Mojtahedi et al. | |
| 2015/0363688 A1* | 12/2015 | Gao | G06F 16/9032 706/27 |
| 2017/0091175 A1* | 3/2017 | Kanayama | G06F 40/58 |
| 2018/0260680 A1* | 9/2018 | Finkelstein | G10L 15/22 |
| 2018/0314689 A1* | 11/2018 | Wang | G10L 15/22 |
| 2019/0155942 A1* | 5/2019 | Tang | G06F 16/93 |
| 2020/0273449 A1* | 8/2020 | Kumar | G06F 16/353 |

OTHER PUBLICATIONS

"International Application Serial No. PCT/US2020/032645, Written Opinion dated Jul. 29, 2020", 5 pgs.

Devlin, J, et al., "Fast and Robust Neural Network Joint Models for Statistical Machine Translation", Proceedings of the 52nd Annual Meeting of the Association for Computational Linguistics, (2014), 1370-1380.

Johnson, Jeff, et al., "Billion-scale similarity search with GPUs", arXiv preprint arXiv:1702.08734, [Online], Retrieved from the Internet: <URL: https://arxiv.org/pdf/1702.08734.pdf>, (2017), 1-12.

Liu, et al., "Representation Learning Using Multi-Task Deep Neural Networks for Semantic Classification and Information Retrieval", in the Proceedings of the North American Chapter of the Association for Computational Linguistics, (May 2015), 912-921.

Papandreou, G, et al., "Gaussian sampling by local perturbations", Proceedings of the 23rd International Conference on Neural Information Processing Systems—vol. 2, (2010), 1858-1866.

Williams, Ronald J, "Simple Statistical Gradient-Following Algorithms for Connectionist Reinforcement Learning", Machine Learning, 8, 1992, (1992), 229-256.

"International Application Serial No. PCT/US2020/032645, International Preliminary Report on Patentability dated Dec. 2, 2021", 7 pgs.

\* cited by examiner

CROSS-LINGUAL INFORMATION RETRIEVAL AND INFORMATION EXTRACTION

TECHNICAL FIELD

Embodiments pertain to computer architecture. Some embodiments relate to neural networks. Some embodiments relate to natural language processing. Some embodiments relate to neural networks trained to perform cross-lingual information retrieval and/or information extraction.

BACKGROUND

In some situations, indicia of an event (e.g., a query) are received in a first natural language and documents related to the event may be in a second natural language. For example, a user may enter a query for "art auctions in China" in the English language, and there may be Chinese language documents that are relevant to event(s) in the query. As the foregoing illustrates, techniques to perform cross-lingual information retrieval and/or information extraction may be desirable.

SUMMARY

Figure 1:
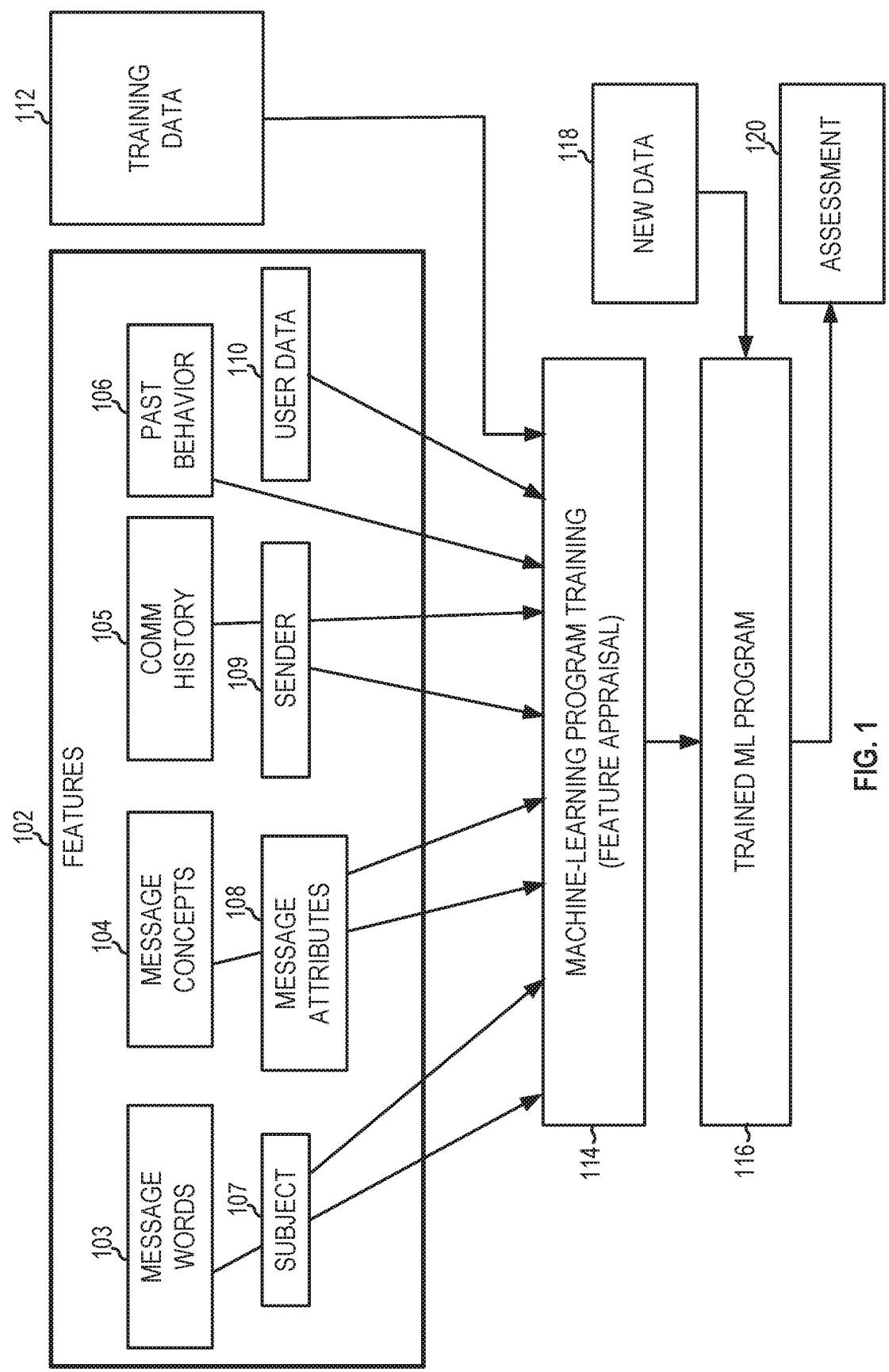
FIG. 1 illustrates the training and use of a machine-learning program, in accordance with some embodiments.

The present disclosure generally relates to machines configured to provide neural networks, including computerized variants of such special-purpose machines and improvements to such variants, and to the technologies by which such special-purpose machines become improved compared to other special-purpose machines that provide technology for neural networks. In particular, the present disclosure addresses neural networks trained by homographic augmentation.

According to some aspects of the technology described herein, a cross-lingual search apparatus include processing circuitry and memory. The processing circuitry accesses a query in a first natural language. The processing circuitry identifies an event corresponding to the query. The processing circuitry computes, using a cross-lingual information retrieval module, a ranked list of documents in a second natural language that are related to the event. At least a portion of documents in the ranked list are selected from a collection of documents in the second natural language that are not annotated with events. The cross-lingual information retrieval module is trained using a dataset comprising annotated documents in the first natural language and translations of the annotated documents into the second natural language. Each annotated document is annotated with one or more events. The processing circuitry provides an output representing at least a portion of the ranked list of documents in the second natural language. The second natural language is different from the first natural language.

According to some aspects of the technology described herein, a training apparatus include processing circuitry and memory. The processing circuitry accesses a dataset comprising annotated documents in a first natural language and translations of the annotated documents into a second natural language. Each annotated document in the first natural language is annotated with one or more events. The second natural language is different from the first natural language. The processing circuitry generates a second natural language document-event map by mapping, to each translation of each annotated document into the second natural language, the one or more events with which the annotated document is annotated. The processing circuitry trains, using a neural network training technique, a cross-lingual information retrieval module to associate a new document in the second natural language to at least one event using the second natural language document-event map. The processing circuitry provides an output representing the trained cross-lingual information retrieval module.

Other aspects include a method to perform the operations of the processing circuitry above, and a machine-readable medium storing instructions for the processing circuitry to perform the above operations.

DETAILED DESCRIPTION

The following description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments. Embodiments set forth in the claims encompass all available equivalents of those claims.

As discussed above, in some situations, indicia of an event (e.g., a query) are received in a first natural language and documents related to the event may be in a second natural language. For example, a user may enter a query for "art auctions in China" in the English language, and there may be Chinese language documents that are relevant to event(s) in the query. As the foregoing illustrates, techniques to perform cross-lingual information retrieval and/or information extraction may be desirable.

As used herein, the phrases "information retrieval" (IR) and "information extraction" (IE) encompass their plain and ordinary meaning. Information retrieval may include finding documents relevant to an event from a corpus of documents. Information extraction may include finding a portion of a document that is responsive to the event. For example, the query "year the American Civil War ended" may correspond an ending event having the object "American Civil War".

Information retrieval may provide one or more documents discussing the end of the Civil War. Information extraction may provide the response "1865." As used herein, the term "event" encompasses its plain and ordinary meaning. An event may be derived from a query and may include one or more of an action, an actor, a location, a time, and the like.

In some examples, an event is a real-world occurrence that includes trigger word(s) and argument(s). An event may be expressed in any natural language and in any form in accordance with formal or colloquial grammar of the natural language. In one example, a natural language text is provided as follows: "Marie flew to Atlanta on February $1^{st}$. She was accompanied by her husband, Ted." This is a travel event, as indicated by the trigger word "flew" and the surrounding context. A structured datapoint representing this event may be as follows:

Event 1
Type: Travel
Subtype: Flight
Traveler: Marie
Traveler: Ted
Date: 02/01/????
Origin: Unknown
Destination: Atlanta Such a datapoint may be stored in a knowledge base with many such similar (and different) events. Such a knowledge base can be automatically queried to find all instances of Marie travelling, people flying to Atlanta on a given date, and the like. A list may be returned with all or a portion of the relevant events. It may be difficult to make such a query directly on unstructured text.

A baseline approach for cross-lingual information retrieval is to use automatic machine translation to translate all documents in a collection into the query language, then use indexing and querying techniques to return relevant translations. This approach propagates errors from machine translation into the document retrieval task by limiting the document retrieval task to the one-best translation for each document. A more successful approach is to retrieve documents in a second natural language (e.g., a foreign language) based on their similarity to seed documents in a first natural language (e.g., English) associated with the query/event. Some aspects measure cross-lingual similarity between the first natural language and second natural language document sets using probabilistic word translations, which we obtain using a Neural Lexical Translation Model. Some aspects use multiple translations with associated probabilities obtained from the parallel corpus. This may, in some cases, outperform the use of one-best translations for retrieval.

Some approaches to information extraction involve training neural network models with supervised (labeled) data to find entities, relations, and events. A multi-task learning approach is sometimes successful in learning the parameters of the models for the various kinds of information jointly, rather than serially. Natural language text may be represented as input to the neural models as word embeddings (e.g., real-valued vectors in a continuous semantic space), or cross-lingual word embeddings in the case that multiple languages are of interest.

Some aspects of the technology disclosed herein relate to training model(s) for both tasks (IR and IE) jointly, in a single neural network architecture. This may, in some cases, improve the outcomes of both by tying the parameters of their models. This may help to overcome the data sparsity problem for supervised learning in both tasks.

Some aspects formulate the information extraction (IE) and information retrieval (IR) task in a generic manner. Some aspects denote the input document by X, and the IE system by $E\theta$ with model parameters $\theta$. A query expansion algorithm produces the set of query seed documents $Q\phi$. The IR system $R\gamma$ then uses the seed documents $Q\phi$ (generated with model parameters $\emptyset$), together with information from the IE system $E\theta$ to produce a relevance-based ranking r of the corpus of foreign documents D:r=R$\gamma$ (D, (X, E$\theta$ (X))).

Some aspects implement a joint model to perform IE and IR so that (1) the errors of IR may be back-propagated to the IE models to improve the parameter estimation, and (2) the improved IE model may improve the performance of IR. Some aspects leverage a Deep Neural Network (DNN) approach to perform multi-task learning for the above IR and IE tasks. Some aspects may simultaneously learn the parameters for the IE, IR, and query expansion models. The objective functions may include to (1) minimize classification losses on the IE tasks given English (or other first language) IE annotation, and (2) minimize the ranking loss on the IR task given the English (or other first language) IR annotations. Some aspects use cross-lingual text representations, optimizing the representation for the IE and IR tasks. Learning the DNN-based joint model may leverage back-propagating errors from the IR models to the other models via the intermediate discrete variables (e.g., detected events from $E\theta$ (X) and suggested query documents from $Q\phi$). Some aspects use sampling techniques to solve this problem.

In some aspects, an inference computing machine accesses a query in a first natural language (e.g., English). The inference computing machine identifies an event corresponding to the query. The inference computing machine computes, using a cross-lingual information retrieval module, a ranked list of documents in a second natural language (e.g., Chinese) that are related to the event. At least a portion of documents in the ranked list are selected from a collection of documents in the second natural language that are not annotated with events. The cross-lingual information retrieval module is trained (e.g., at a training computing machine, which may be the same as or different from the inference computing machine) using a dataset comprising annotated documents in the first natural language and translations of the annotated documents into the second natural language. Each annotated document is annotated with one or more events. The inference computing machine provides an output representing at least a portion of the ranked list of documents in the second natural language. The second natural language is different from the first natural language.

In some aspects, a training computing machine accesses a dataset comprising annotated documents in a first natural language and translations of the annotated documents into a second natural language. Each annotated document in the first natural language is annotated with one or more events. The second natural language is different from the first natural language. The training computing machine generates a second natural language document-event map by mapping, to each translation of each annotated document into the second natural language, the one or more events with which the annotated document is annotated. The training computing machine trains, using a neural network training technique, a cross-lingual information retrieval module to associate a new document in the second natural language to at least one event using the second natural language document-event map. The training computing machine provides an output representing the trained cross-lingual information retrieval module.

FIG. 1 illustrates the training and use of a machine-learning program, according to some example embodiments. In some example embodiments, machine-learning programs (MLPs), also referred to as machine-learning algorithms or tools, are utilized to perform operations associated with machine learning tasks, such as image recognition or machine translation.

Machine learning is a field of study that gives computers the ability to learn without being explicitly programmed. Machine learning explores the study and construction of algorithms, also referred to herein as tools, which may learn from existing data and make predictions about new data. Such machine-learning tools operate by building a model from example training data 112 in order to make data-driven predictions or decisions expressed as outputs or assessments 120. Although example embodiments are presented with respect to a few machine-learning tools, the principles presented herein may be applied to other machine-learning tools.

In some example embodiments, different machine-learning tools may be used. For example, Logistic Regression (LR), Naive-Bayes, Random Forest (RF), neural networks (NN), matrix factorization, and Support Vector Machines (SVM) tools may be used for classifying or scoring job postings.

Two common types of problems in machine learning are classification problems and regression problems. Classification problems, also referred to as categorization problems, aim at classifying items into one of several category values (for example, is this object an apple or an orange). Regression algorithms aim at quantifying some items (for example, by providing a value that is a real number). The machine-learning algorithms utilize the training data 112 to find correlations among identified features 102 that affect the outcome.

The machine-learning algorithms utilize features 102 for analyzing the data to generate assessments 120. A feature 102 is an individual measurable property of a phenomenon being observed. The concept of a feature is related to that of an explanatory variable used in statistical techniques such as linear regression. Choosing informative, discriminating, and independent features is important for effective operation of the MLP in pattern recognition, classification, and regression. Features may be of different types, such as numeric features, strings, and graphs.

In one example embodiment, the features 102 may be of different types and may include one or more of words of the message 103, message concepts 104, communication history 105, past user behavior 106, subject of the message 107, other message attributes 108, sender 109, and user data 110.

The machine-learning algorithms utilize the training data 112 to find correlations among the identified features 102 that affect the outcome or assessment 120. In some example embodiments, the training data 112 includes labeled data, which is known data for one or more identified features 102 and one or more outcomes, such as detecting communication patterns, detecting the meaning of the message, generating a summary of the message, detecting action items in the message, detecting urgency in the message, detecting a relationship of the user to the sender, calculating score attributes, calculating message scores, etc.

With the training data 112 and the identified features 102, the machine-learning tool is trained at operation 114. The machine-learning tool appraises the value of the features 102 as they correlate to the training data 112. The result of the training is the trained machine-learning program 116.

When the machine-learning program 116 is used to perform an assessment, new data 118 is provided as an input to the trained machine-learning program 116, and the machine-learning program 116 generates the assessment 120 as output. For example, when a message is checked for an action item, the machine-learning program utilizes the message content and message metadata to determine if there is a request for an action in the message.

Machine learning techniques train models to accurately make predictions on data fed into the models (e.g., what was said by a user in a given utterance; whether a noun is a person, place, or thing; what the weather will be like tomorrow). During a learning phase, the models are developed against a training dataset of inputs to optimize the models to correctly predict the output for a given input. Generally, the learning phase may be supervised, semi-supervised, or unsupervised; indicating a decreasing level to which the "correct" outputs are provided in correspondence to the training inputs. In a supervised learning phase, all of the outputs are provided to the model and the model is directed to develop a general rule or algorithm that maps the input to the output. In contrast, in an unsupervised learning phase, the desired output is not provided for the inputs so that the model may develop its own rules to discover relationships within the training dataset. In a semi-supervised learning phase, an incompletely labeled training set is provided, with some of the outputs known and some unknown for the training dataset.

Models may be run against a training dataset for several epochs (e.g., iterations), in which the training dataset is repeatedly fed into the model to refine its results. For example, in a supervised learning phase, a model is developed to predict the output for a given set of inputs, and is evaluated over several epochs to more reliably provide the output that is specified as corresponding to the given input for the greatest number of inputs for the training dataset. In another example, for an unsupervised learning phase, a model is developed to cluster the dataset into n groups, and is evaluated over several epochs as to how consistently it places a given input into a given group and how reliably it produces the n desired clusters across each epoch.

Once an epoch is run, the models are evaluated and the values of their variables are adjusted to attempt to better refine the model in an iterative fashion. In various aspects, the evaluations are biased against false negatives, biased against false positives, or evenly biased with respect to the overall accuracy of the model. The values may be adjusted in several ways depending on the machine learning technique used. For example, in a genetic or evolutionary algorithm, the values for the models that are most successful in predicting the desired outputs are used to develop values for models to use during the subsequent epoch, which may include random variation/mutation to provide additional data points. One of ordinary skill in the art will be familiar with several other machine learning algorithms that may be applied with the present disclosure, including linear regression, random forests, decision tree learning, neural networks, deep neural networks, etc.

Each model develops a rule or algorithm over several epochs by varying the values of one or more variables affecting the inputs to more closely map to a desired result, but as the training dataset may be varied, and is preferably very large, perfect accuracy and precision may not be achievable. A number of epochs that make up a learning phase, therefore, may be set as a given number of trials or a fixed time/computing budget, or may be terminated before that number/budget is reached when the accuracy of a given model is high enough or low enough or an accuracy plateau has been reached. For example, if the training phase is designed to run n epochs and produce a model with at least 95% accuracy, and such a model is produced before the $n^{th}$ epoch, the learning phase may end early and use the produced model satisfying the end-goal accuracy threshold. Similarly, if a given model is inaccurate enough to satisfy a random chance threshold (e.g., the model is only 55% accurate in determining true/false outputs for given inputs), the learning phase for that model may be terminated early, although other models in the learning phase may continue training. Similarly, when a given model continues to provide similar accuracy or vacillate in its results across multiple epochs—having reached a performance plateau—the learning phase for the given model may terminate before the epoch number/computing budget is reached.

Once the learning phase is complete, the models are finalized. In some example embodiments, models that are finalized are evaluated against testing criteria. In a first example, a testing dataset that includes known outputs for its inputs is fed into the finalized models to determine an accuracy of the model in handling data that is has not been trained on. In a second example, a false positive rate or false negative rate may be used to evaluate the models after finalization. In a third example, a delineation between data clusterings is used to select a model that produces the clearest bounds for its clusters of data.

Figure 2:
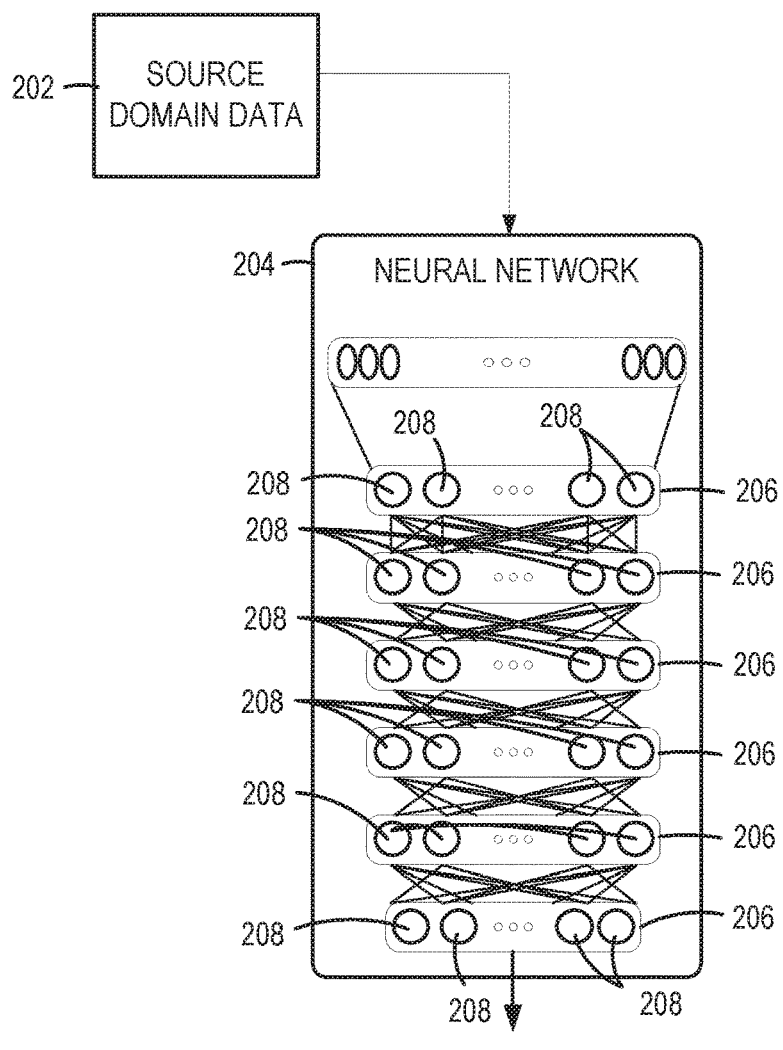
FIG. 2 illustrates an example neural network, in accordance with some embodiments.
Figure 2:
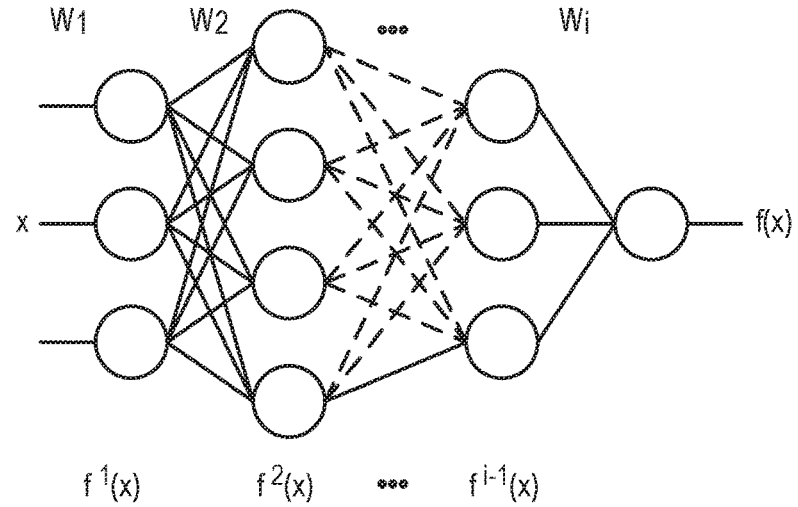

FIG. 2 illustrates an example neural network 204, in accordance with some embodiments. As shown, the neural network 204 receives, as input, source domain data 202. The input is passed through a plurality of layers 206 to arrive at an output. Each layer 206 includes multiple neurons 208. The neurons 208 receive input from neurons of a previous layer and apply weights to the values received from those neurons in order to generate a neuron output. The neuron outputs from the final layer 206 are combined to generate the output of the neural network 204.

As illustrated at the bottom of FIG. 2, the input is a vector x. The input is passed through multiple layers 206, where weights $W_1, W_2, \ldots, W_i$ are applied to the input to each layer to arrive at $f^1(x), f^2(x), \ldots, f^{i-1}(x)$, until finally the output f(x) is computed.

In some example embodiments, the neural network 204 (e.g., deep learning, deep convolutional, or recurrent neural network) comprises a series of neurons 208, such as Long Short Term Memory (LSTM) nodes, arranged into a network. A neuron 208 is an architectural element used in data processing and artificial intelligence, particularly machine learning, which includes memory that may determine when to "remember" and when to "forget" values held in that memory based on the weights of inputs provided to the given neuron 208. Each of the neurons 208 used herein are configured to accept a predefined number of inputs from other neurons 208 in the neural network 204 to provide relational and sub-relational outputs for the content of the frames being analyzed. Individual neurons 208 may be chained together and/or organized into tree structures in various configurations of neural networks to provide interactions and relationship learning modeling for how each of the frames in an utterance are related to one another.

For example, an LSTM node serving as a neuron includes several gates to handle input vectors (e.g., phonemes from an utterance), a memory cell, and an output vector (e.g., contextual representation). The input gate and output gate control the information flowing into and out of the memory cell, respectively, whereas forget gates optionally remove information from the memory cell based on the inputs from linked cells earlier in the neural network. Weights and bias vectors for the various gates are adjusted over the course of a training phase, and once the training phase is complete, those weights and biases are finalized for normal operation.

One of skill in the art will appreciate that neurons and neural networks may be constructed programmatically (e.g., via software instructions) or via specialized hardware linking each neuron to form the neural network.

Neural networks utilize features for analyzing the data to generate assessments (e.g., recognize units of speech). A feature is an individual measurable property of a phenomenon being observed. The concept of feature is related to that of an explanatory variable used in statistical techniques such as linear regression. Further, deep features represent the output of nodes in hidden layers of the deep neural network.

A neural network, sometimes referred to as an artificial neural network, is a computing system/apparatus based on consideration of biological neural networks of animal brains. Such systems/apparatus progressively improve performance, which is referred to as learning, to perform tasks, typically without task-specific programming. For example, in image recognition, a neural network may be taught to identify images that contain an object by analyzing example images that have been tagged with a name for the object and, having learnt the object and name, may use the analytic results to identify the object in untagged images. A neural network is based on a collection of connected units called neurons, where each connection, called a synapse, between neurons can transmit a unidirectional signal with an activating strength that varies with the strength of the connection. The receiving neuron can activate and propagate a signal to downstream neurons connected to it, typically based on whether the combined incoming signals, which are from potentially many transmitting neurons, are of sufficient strength, where strength is a parameter.

A deep neural network (DNN) is a stacked neural network, which is composed of multiple layers. The layers are composed of nodes, which are locations where computation occurs, loosely patterned on a neuron in the human brain, which fires when it encounters sufficient stimuli. A node combines input from the data with a set of coefficients, or weights, that either amplify or dampen that input, which assigns significance to inputs for the task the algorithm is trying to learn. These input-weight products are summed, and the sum is passed through what is called a node's activation function, to determine whether and to what extent that signal progresses further through the network to affect the ultimate outcome. A DNN uses a cascade of many layers of non-linear processing units for feature extraction and transformation. Each successive layer uses the output from the previous layer as input. Higher-level features are derived from lower-level features to form a hierarchical representation. The layers following the input layer may be convolution layers that produce feature maps that are filtering results of the inputs and are used by the next convolution layer.

In training of a DNN architecture, a regression, which is structured as a set of statistical processes for estimating the relationships among variables, can include a minimization of a cost function. The cost function may be implemented as a function to return a number representing how well the neural network performed in mapping training examples to correct output. In training, if the cost function value is not within a pre-determined range, based on the known training images, backpropagation is used, where backpropagation is a common method of training artificial neural networks that are used with an optimization method such as a stochastic gradient descent (SGD) method.

Use of backpropagation can include propagation and weight update. When an input is presented to the neural network, it is propagated forward through the neural network, layer by layer, until it reaches the output layer. The output of the neural network is then compared to the desired output, using the cost function, and an error value is calculated for each of the nodes in the output layer. The error values are propagated backwards, starting from the output, until each node has an associated error value which roughly represents its contribution to the original output. Backpropagation can use these error values to calculate the gradient of the cost function with respect to the weights in the neural network. The calculated gradient is fed to the selected optimization method to update the weights to attempt to minimize the cost function.

Figure 3:
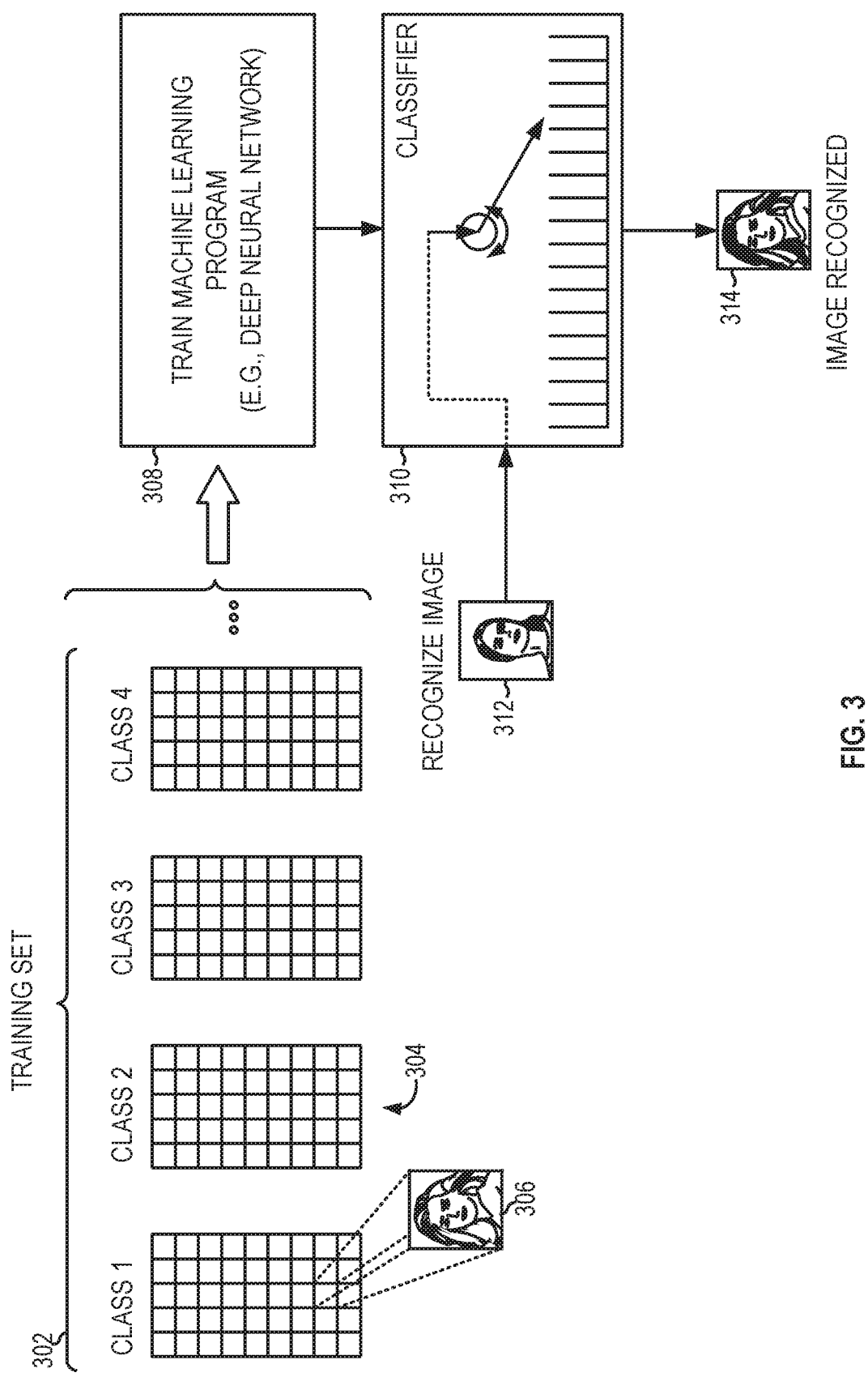
FIG. 3 illustrates the training of an image recognition machine learning program, in accordance with some embodiments.

FIG. 3 illustrates the training of an image recognition machine learning program, in accordance with some embodiments. The machine learning program may be implemented at one or more computing machines. Block 302 illustrates a training set, which includes multiple classes 304. Each class 304 includes multiple images 306 associated with the class. Each class 304 may correspond to a type of object in the image 306 (e.g., a digit 0-9, a man or a woman, a cat or a dog, etc.). In one example, the machine learning program is trained to recognize images of the presidents of the United States, and each class corresponds to each president (e.g., one class corresponds to Donald Trump, one class corresponds to Barack Obama, one class corresponds to George W. Bush, etc.). At block 308 the machine learning program is trained, for example, using a deep neural network. At block 310, the trained classifier, generated by the training of block 308, recognizes an image 312, and at block 314 the image is recognized. For example, if the image 312 is a photograph of Bill Clinton, the classifier recognizes the image as corresponding to Bill Clinton at block 314.

FIG. 3 illustrates the training of a classifier, according to some example embodiments. A machine learning algorithm is designed for recognizing faces, and a training set 302 includes data that maps a sample to a class 304 (e.g., a class includes all the images of purses). The classes may also be referred to as labels. Although embodiments presented herein are presented with reference to object recognition, the same principles may be applied to train machine-learning programs used for recognizing any type of items.

The training set 302 includes a plurality of images 306 for each class 304 (e.g., image 306), and each image is associated with one of the categories to be recognized (e.g., a class). The machine learning program is trained 308 with the training data to generate a classifier 310 operable to recognize images. In some example embodiments, the machine learning program is a DNN.

When an input image 312 is to be recognized, the classifier 310 analyzes the input image 312 to identify the class (e.g., class 314) corresponding to the input image 312.

Figure 4:
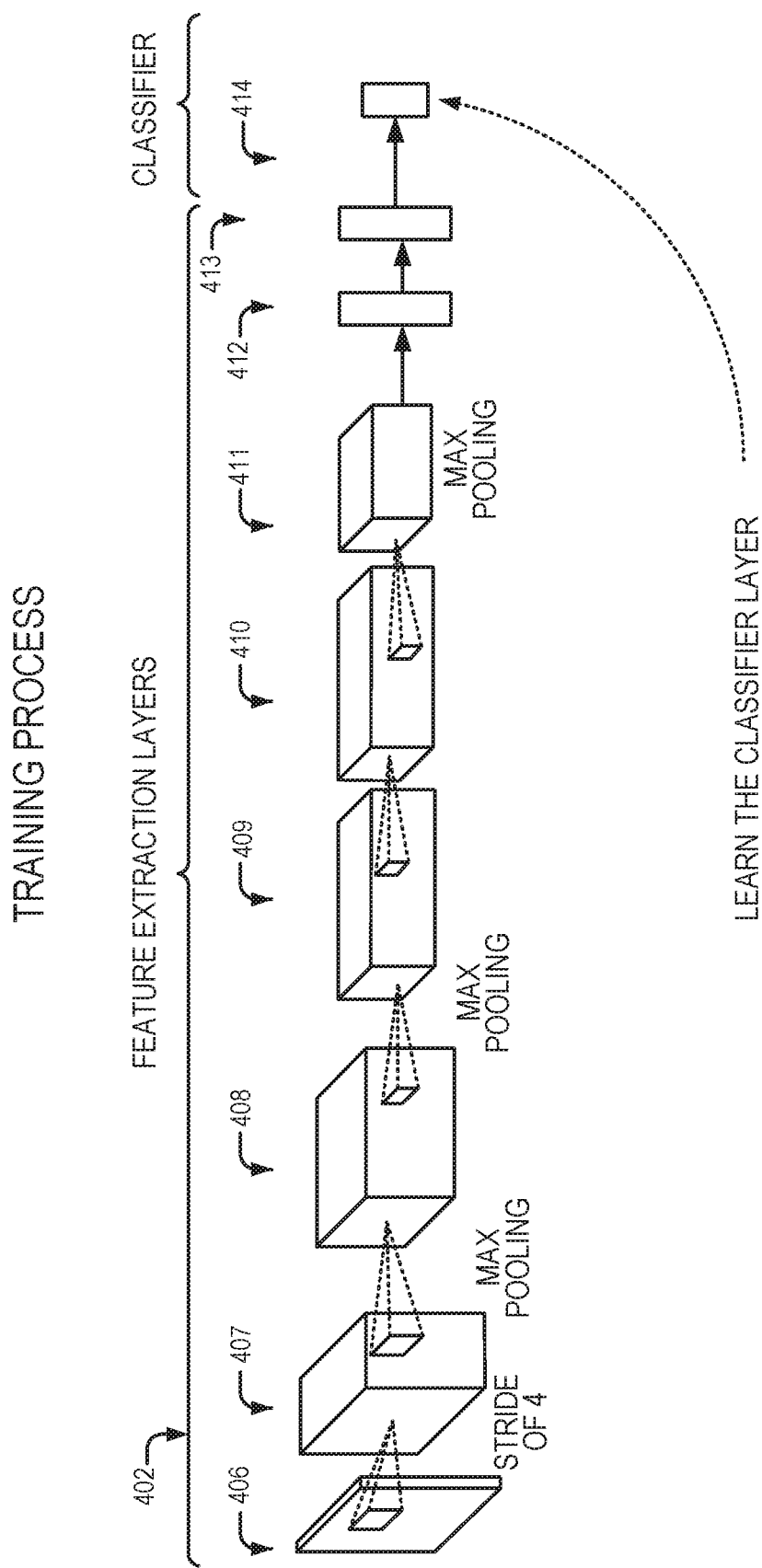
FIG. 4 illustrates the feature-extraction process and classifier training, in accordance with some embodiments.

FIG. 4 illustrates the feature-extraction process and classifier training, according to some example embodiments. Training the classifier may be divided into feature extraction layers 402 and classifier layer 414. Each image is analyzed in sequence by a plurality of layers 406-413 in the feature-extraction layers 402.

With the development of deep convolutional neural networks, the focus in face recognition has been to learn a good face feature space, in which faces of the same person are close to each other, and faces of different persons are far away from each other. For example, the verification task with the LFW (Labeled Faces in the Wild) dataset has been often used for face verification.

Many face identification tasks (e.g., MegaFace and LFW) are based on a similarity comparison between the images in the gallery set and the query set, which is essentially a K-nearest-neighborhood (KNN) method to estimate the person's identity. In the ideal case, there is a good face feature extractor (inter-class distance is always larger than the intra-class distance), and the KNN method is adequate to estimate the person's identity.

Feature extraction is a process to reduce the amount of resources required to describe a large set of data. When performing analysis of complex data, one of the major problems stems from the number of variables involved. Analysis with a large number of variables generally requires a large amount of memory and computational power, and it may cause a classification algorithm to overfit to training samples and generalize poorly to new samples. Feature extraction is a general term describing methods of constructing combinations of variables to get around these large data-set problems while still describing the data with sufficient accuracy for the desired purpose.

In some example embodiments, feature extraction starts from an initial set of measured data and builds derived values (features) intended to be informative and non-redundant, facilitating the subsequent learning and generalization steps. Further, feature extraction is related to dimensionality reduction, such as be reducing large vectors (sometimes with very sparse data) to smaller vectors capturing the same, or similar, amount of information.

Determining a subset of the initial features is called feature selection. The selected features are expected to contain the relevant information from the input data, so that the desired task can be performed by using this reduced representation instead of the complete initial data. DNN utilizes a stack of layers, where each layer performs a function. For example, the layer could be a convolution, a non-linear transform, the calculation of an average, etc. Eventually this DNN produces outputs by classifier 414. In FIG. 4, the data travels from left to right and the features are extracted. The goal of training the neural network is to find the parameters of all the layers that make them adequate for the desired task.

As shown in FIG. 4, a "stride of 4" filter is applied at layer 406, and max pooling is applied at layers 407-413. The stride controls how the filter convolves around the input volume. "Stride of 4" refers to the filter convolving around the input volume four units at a time. Max pooling refers to down-sampling by selecting the maximum value in each max pooled region.

In some example embodiments, the structure of each layer is predefined. For example, a convolution layer may contain small convolution kernels and their respective convolution parameters, and a summation layer may calculate the sum, or the weighted sum, of two pixels of the input image. Training assists in defining the weight coefficients for the summation.

One way to improve the performance of DNNs is to identify newer structures for the feature-extraction layers, and another way is by improving the way the parameters are identified at the different layers for accomplishing a desired task. The challenge is that for a typical neural network, there may be millions of parameters to be optimized. Trying to optimize all these parameters from scratch may take hours, days, or even weeks, depending on the amount of computing resources available and the amount of data in the training set.

Figure 5:
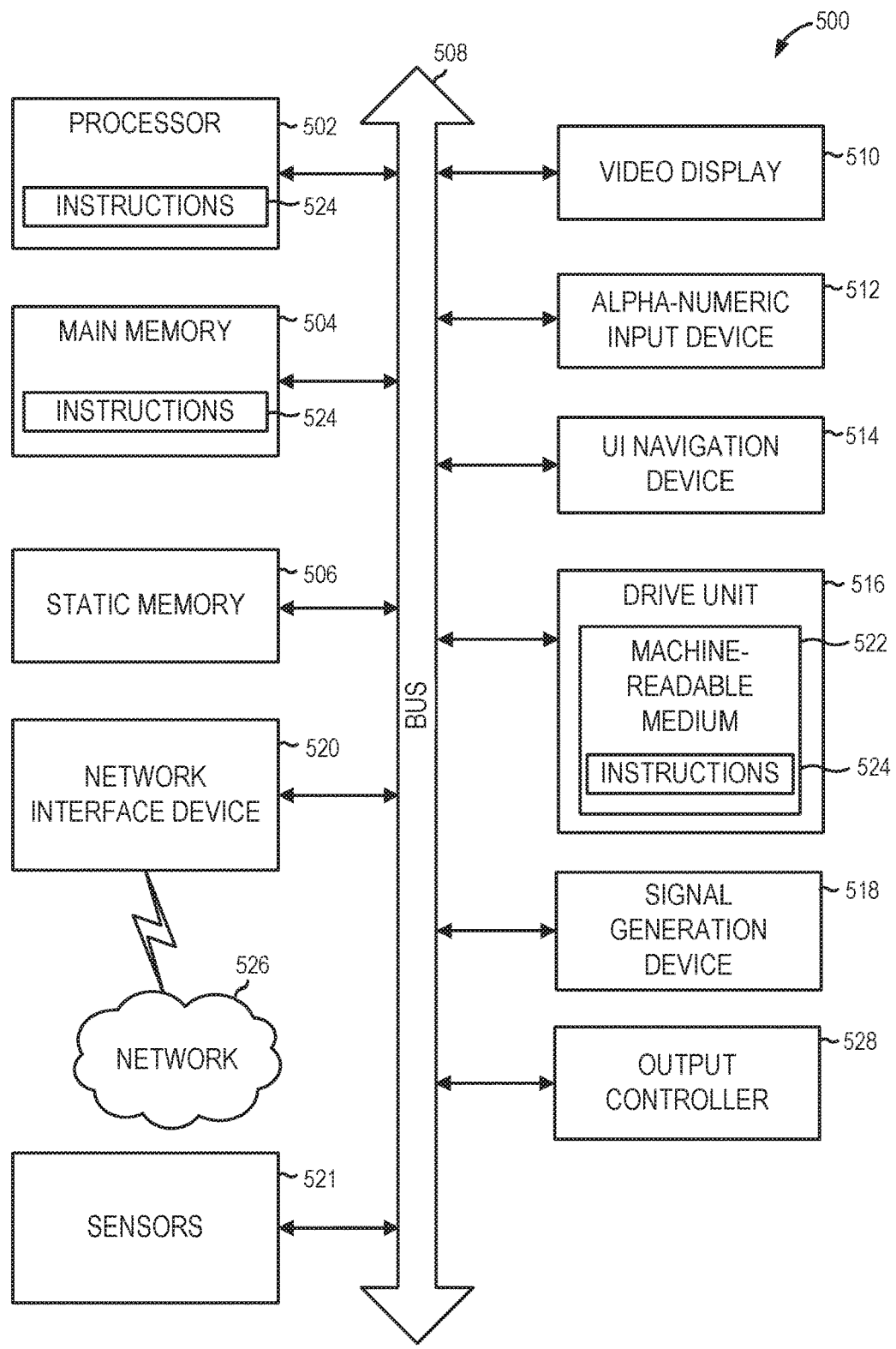
FIG. 5 is a block diagram of a computing machine, in accordance with some embodiments.

FIG. 5 illustrates a circuit block diagram of a computing machine 500 in accordance with some embodiments. In some embodiments, components of the computing machine 500 may store or be integrated into other components shown in the circuit block diagram of FIG. 5. For example, portions of the computing machine 500 may reside in the processor 502 and may be referred to as "processing circuitry." Processing circuitry may include processing hardware, for example, one or more central processing units (CPUs), one or more graphics processing units (GPUs), and the like. In alternative embodiments, the computing machine 500 may operate as a standalone device or may be connected (e.g., networked) to other computers. In a networked deployment, the computing machine 500 may operate in the capacity of a server, a client, or both in server-client network environments. In an example, the computing machine 500 may act as a peer machine in peer-to-peer (P2P) (or other distributed) network environment. In this document, the phrases P2P, device-to-device (D2D) and sidelink may be used interchangeably. The computing machine 500 may be a specialized computer, a personal computer (PC), a tablet PC, a personal digital assistant (PDA), a mobile telephone, a smart phone, a web appliance, a network router, switch or bridge, or any machine capable of executing instructions (sequential or otherwise) that specify actions to be taken by that machine.

Examples, as described herein, may include, or may operate on, logic or a number of components, modules, or mechanisms. Modules and components are tangible entities (e.g., hardware) capable of performing specified operations and may be configured or arranged in a certain manner. In an example, circuits may be arranged (e.g., internally or with respect to external entities such as other circuits) in a specified manner as a module. In an example, the whole or part of one or more computer systems/apparatus (e.g., a standalone, client or server computer system) or one or more hardware processors may be configured by firmware or software (e.g., instructions, an application portion, or an application) as a module that operates to perform specified operations. In an example, the software may reside on a machine readable medium. In an example, the software, when executed by the underlying hardware of the module, causes the hardware to perform the specified operations.

Accordingly, the term "module" (and "component") is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein. Considering examples in which modules are temporarily configured, each of the modules need not be instantiated at any one moment in time. For example, where the modules comprise a general-purpose hardware processor configured using software, the general-purpose hardware processor may be configured as respective different modules at different times. Software may accordingly configure a hardware processor, for example, to constitute a particular module at one instance of time and to constitute a different module at a different instance of time.

The computing machine 500 may include a hardware processor 502 (e.g., a central processing unit (CPU), a GPU, a hardware processor core, or any combination thereof), a main memory 504 and a static memory 506, some or all of which may communicate with each other via an interlink (e.g., bus) 508. Although not shown, the main memory 504 may contain any or all of removable storage and non-removable storage, volatile memory or non-volatile memory. The computing machine 500 may further include a video display unit 510 (or other display unit), an alphanumeric input device 512 (e.g., a keyboard), and a user interface (UI) navigation device 514 (e.g., a mouse). In an example, the display unit 510, input device 512 and UI navigation device 514 may be a touch screen display. The computing machine 500 may additionally include a storage device (e.g., drive unit) 516, a signal generation device 518 (e.g., a speaker), a network interface device 520, and one or more sensors 521, such as a global positioning system (GPS) sensor, compass, accelerometer, or other sensor. The computing machine 500 may include an output controller 528, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

The drive unit 516 (e.g., a storage device) may include a machine readable medium 522 on which is stored one or more sets of data structures or instructions 524 (e.g., software) embodying or utilized by any one or more of the techniques or functions described herein. The instructions 524 may also reside, completely or at least partially, within the main memory 504, within static memory 506, or within the hardware processor 502 during execution thereof by the computing machine 500. In an example, one or any combination of the hardware processor 502, the main memory 504, the static memory 506, or the storage device 516 may constitute machine readable media.

While the machine readable medium 522 is illustrated as a single medium, the term "machine readable medium" may include a single medium or multiple media (e.g., a centralized or distributed database, and/or associated caches and servers) configured to store the one or more instructions 524.

The term "machine readable medium" may include any medium that is capable of storing, encoding, or carrying instructions for execution by the computing machine 500 and that cause the computing machine 500 to perform any one or more of the techniques of the present disclosure, or that is capable of storing, encoding or carrying data structures used by or associated with such instructions. Non-limiting machine readable medium examples may include solid-state memories, and optical and magnetic media. Specific examples of machine readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; Random Access Memory (RAM); and CD-ROM and DVD-ROM disks. In some examples, machine readable media may include non-transitory machine readable media. In some examples, machine readable media may include machine readable media that is not a transitory propagating signal.

The instructions 524 may further be transmitted or received over a communications network 526 using a transmission medium via the network interface device 520 utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, a Long Term Evolution (LTE) family of standards, a Universal Mobile Telecommunications System (UMTS) family of standards, peer-to-peer (P2P) networks, among others. In an example, the network interface device 520 may include one or more physical jacks (e.g., Ethernet, coaxial, or phone jacks) or one or more antennas to connect to the communications network 526.

Figure 6:
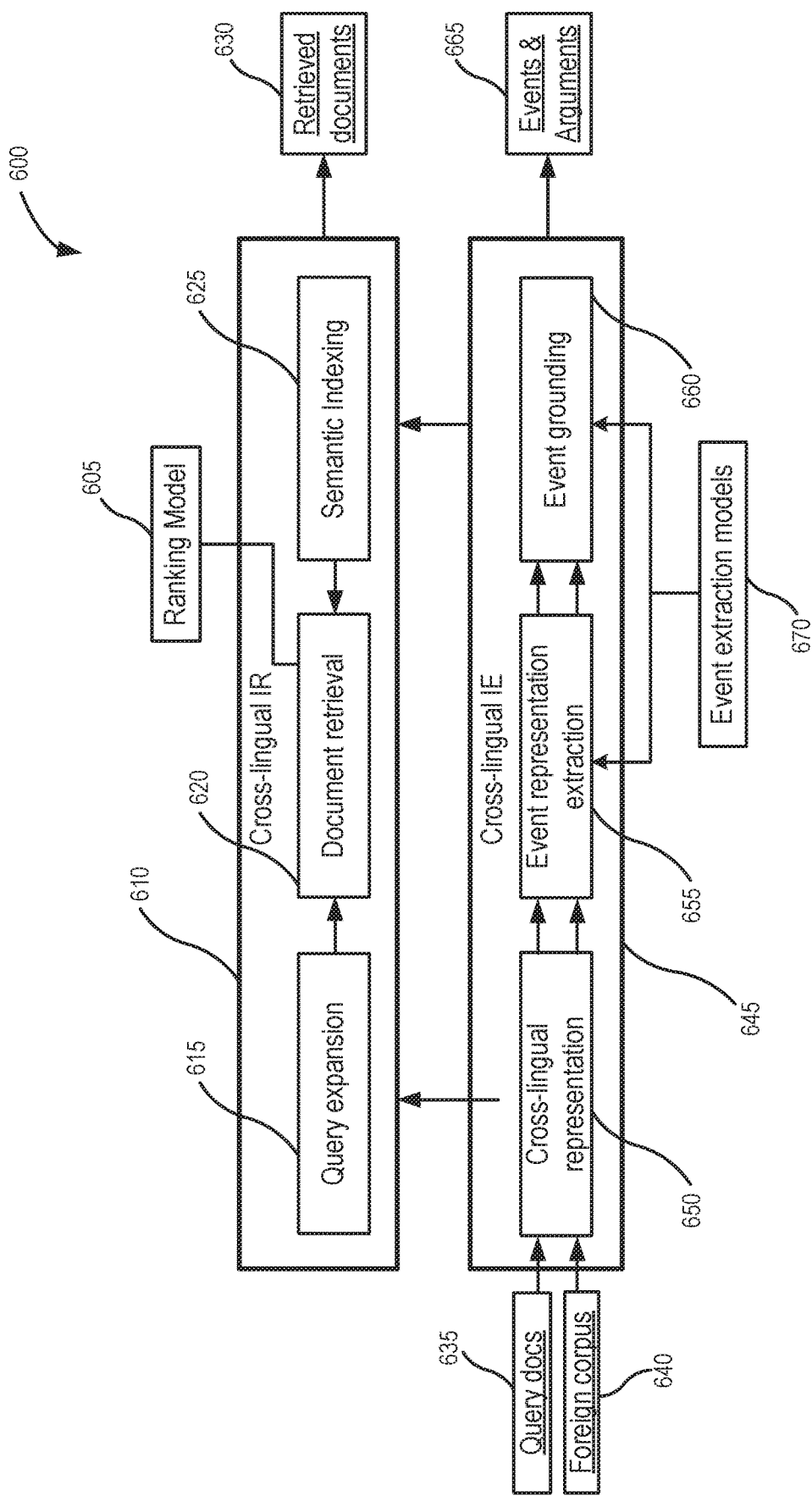
FIG. 6 illustrates cross-lingual information retrieval (IR) and information extraction (IE), in accordance with some embodiments.

FIG. 6 is a data flow diagram 600 that illustrates cross-lingual information retrieval (IR) 610 and information extraction (IE) 645, in accordance with some embodiments.

As shown in FIG. 6, query documents (docs) 635 and a foreign corpus 640 are provided to a cross-lingual representation module 650 of the cross-lingual IE. The cross-lingual representation module generates a cross-lingual representation and provides it to the event representation extraction 655 and a query expansion module 615 of the cross-lingual IR. The event representation extraction 655 leverages event extraction models 670 to generate an event grounding 660. The event grounding 660 is used to generate events and arguments 665, the output of the cross-lingual IE. The event grounding 660 output is also provided to the semantic indexing module 625 of the cross-lingual IR.

The cross-lingual IR 610 includes a query expansion module 615, which expands the query to event(s). The output of the query expansion module 615 is fed to a document retrieval module 620, which retrieves documents relevant to the event(s) using a ranking model 605. The document retrieval module 620 also leverages the semantic indexing module 625. The output of the cross-lingual IR 610 is a set of retrieved documents 630.

Figure 7:
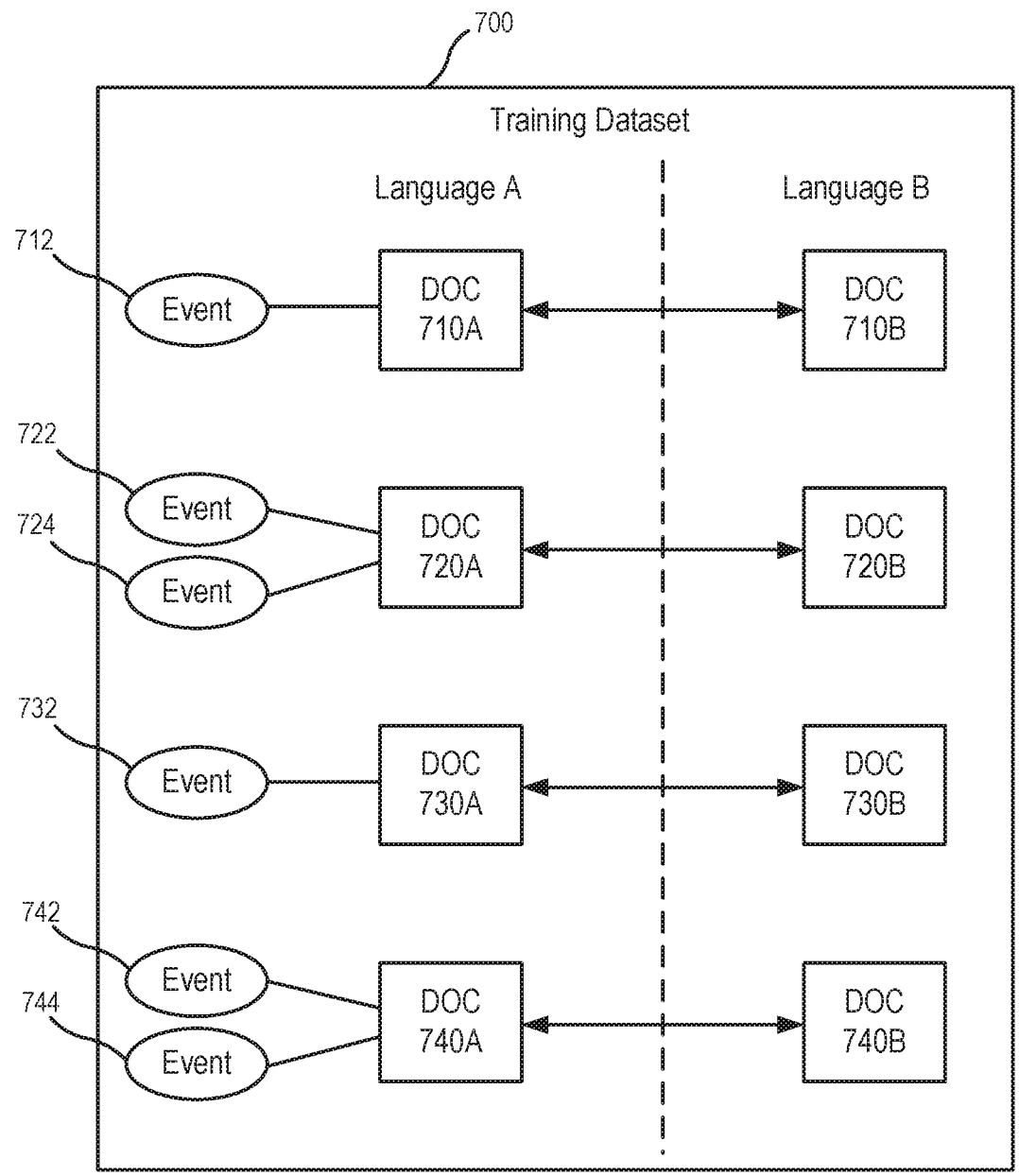
FIG. 7 illustrates an example training dataset, in accordance with some embodiments.

FIG. 7 illustrates an example training dataset 700, in accordance with some embodiments.

As shown, the training dataset includes four documents (docs) 710A, 720A, 730A, and 740A in a first natural language—Language A (e.g., English). While four documents 710A, 720A, 730A, and 740A in Language A are illustrated, there may be any number of such documents, for example, thousands or millions of documents. Each document 710A, 720A, 730A, and 740A in Language A is annotated with one or more events. As shown, document 710A is annotated with event 712. Document 720A is annotated with events 722 and 724. Document 730A is annotated with event 732. Document 740A is annotated with events 742 and 744. In some cases, the annotations may correspond to portion(s) of the document that describe the event. For example, if the event corresponds to "year the American Civil War ended," the annotation may be coupled with (e.g., include a pointer to) the sentence: "The American Civil War ended on Apr. 9, 1865," which is within the document.

As further illustrated, each document 710A, 720A, 730A, and 740A in Language A is coupled with a translation into Language B—a second natural language (e.g., Russian). As shown, the translations of the documents 710A, 720A, 730A, and 740A are the documents 710B, 720B, 730B, and 740B, respectively. This coupling allows the events 712, 722, 724, 732, 742, and 744 that are mapped to the Language A documents 710A, 720A, 730A, and 740A to be mapped to the Language B documents 710B, 720B, 730B, and 740B also.

Figure 8:
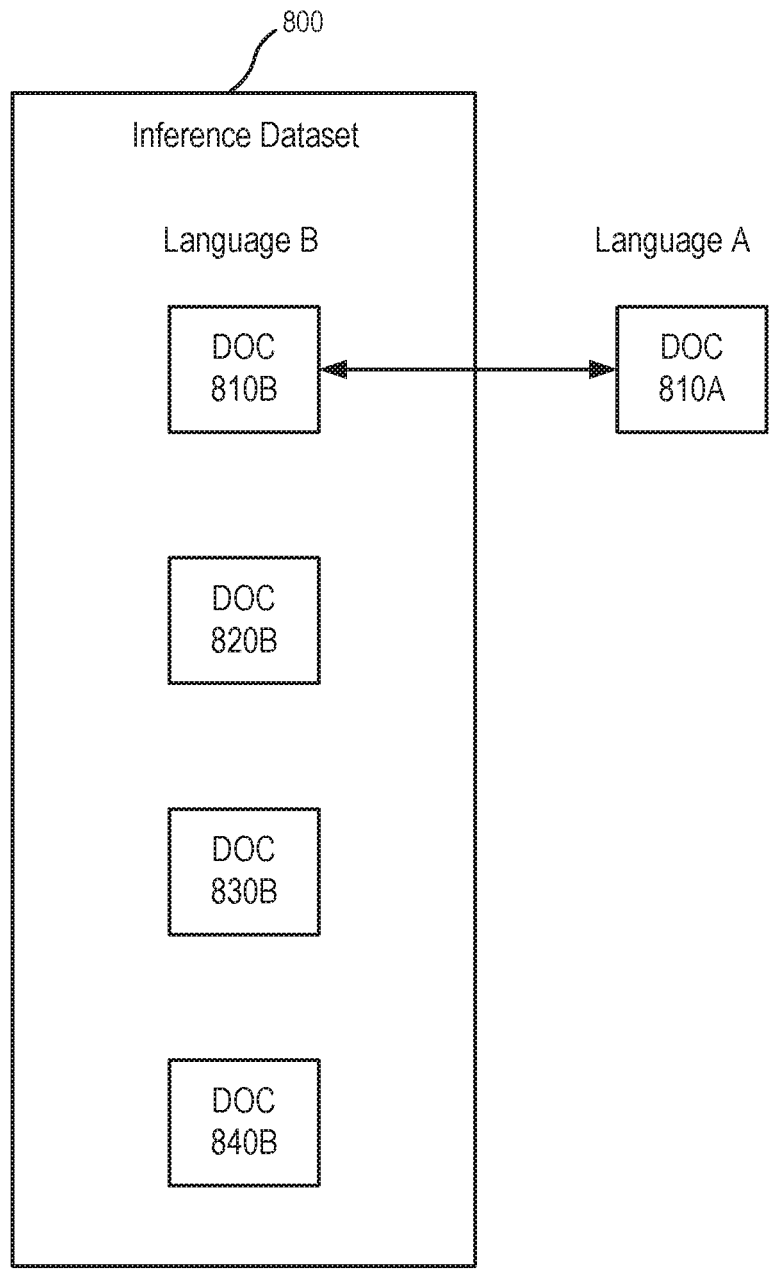
FIG. 8 illustrates an example inference dataset, in accordance with some embodiments.

FIG. 8 illustrates an example inference dataset 800, in accordance with some embodiments. As shown, the inference dataset includes four documents 810B, 820B, 830B, and 840B in Language B. While four documents are illustrated, any number of documents may be used. For example, there may be thousands or millions of documents. As shown, the document 810B is translated into Language A as the document 810A. In some cases, translations of the other documents 820B, 830B, and 840B into Language A are not available.

Figure 9:
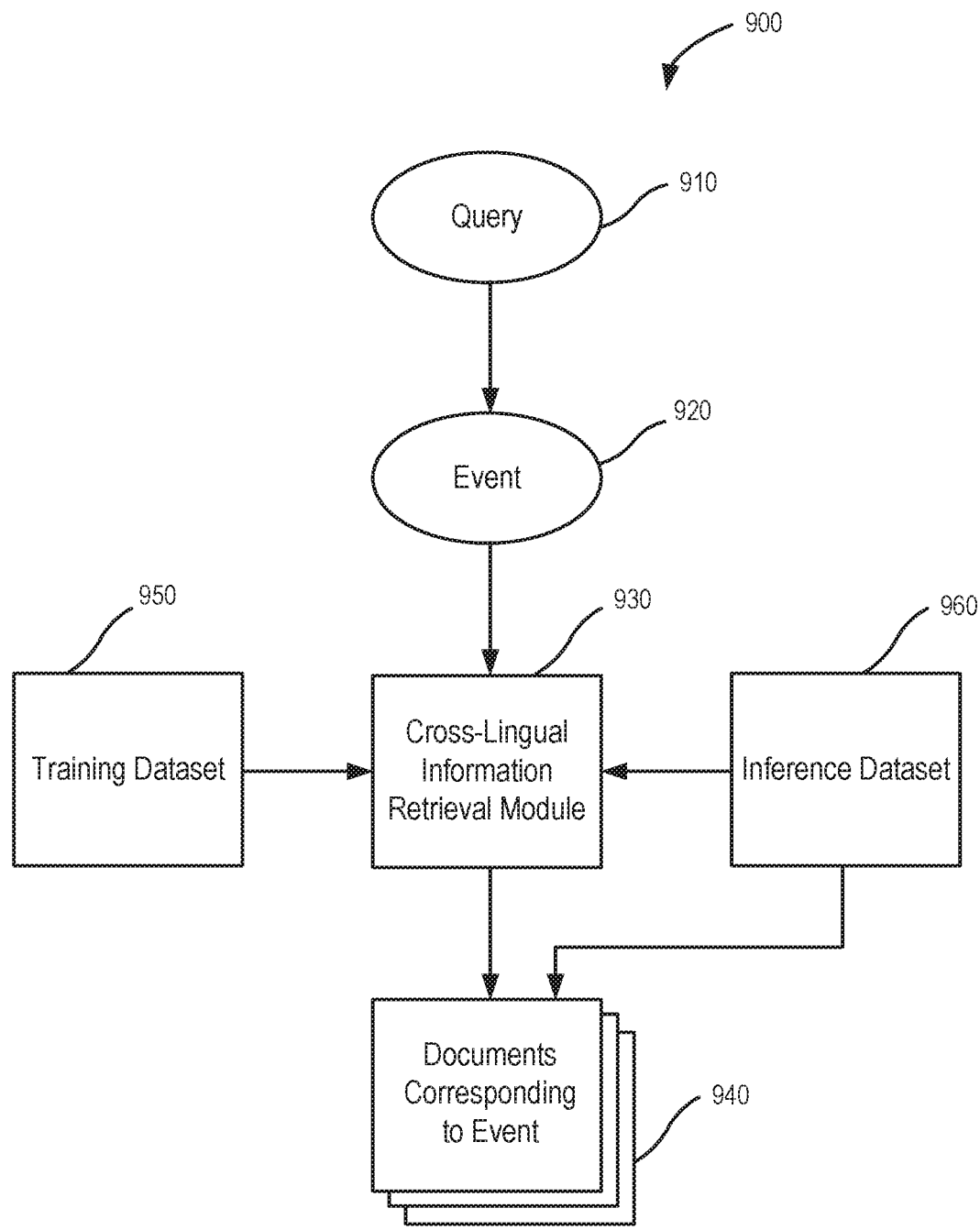
FIG. 9 is a data flow diagram for training and inference of cross-lingual information retrieval (IR) and information extraction (IE), in accordance with some embodiments.

FIG. 9 is a data flow diagram 900 for training and inference of cross-lingual information retrieval (IR) and information extraction (IE), in accordance with some embodiments.

As shown, a query 910 is converted to an event 920 based on the text of the query 910. The query 910 is in a first natural language. The event 920 represents a real-world occurrence corresponding to the query 910. The event 920 includes trigger word(s) and argument(s) from the query 910.

The event 920 is provided to a cross-lingual information retrieval module 930. The cross-lingual information retrieval module 930 generates a ranked list of documents 940 in a second natural language (different from the first natural language) that are related to the event 920. The generated documents 940 are selected from documents in the second natural language from an inference dataset 960, some or all of which might not be annotated with events. An example inference dataset 960 is shown in FIG. 8.

As shown in FIG. 9, the cross-lingual information retrieval module 930 is trained using a training dataset 950. The training dataset 950 may include documents in the first natural language that are annotated with events and translated into the second natural language as shown, for example, in FIG. 7.

Figure 10:
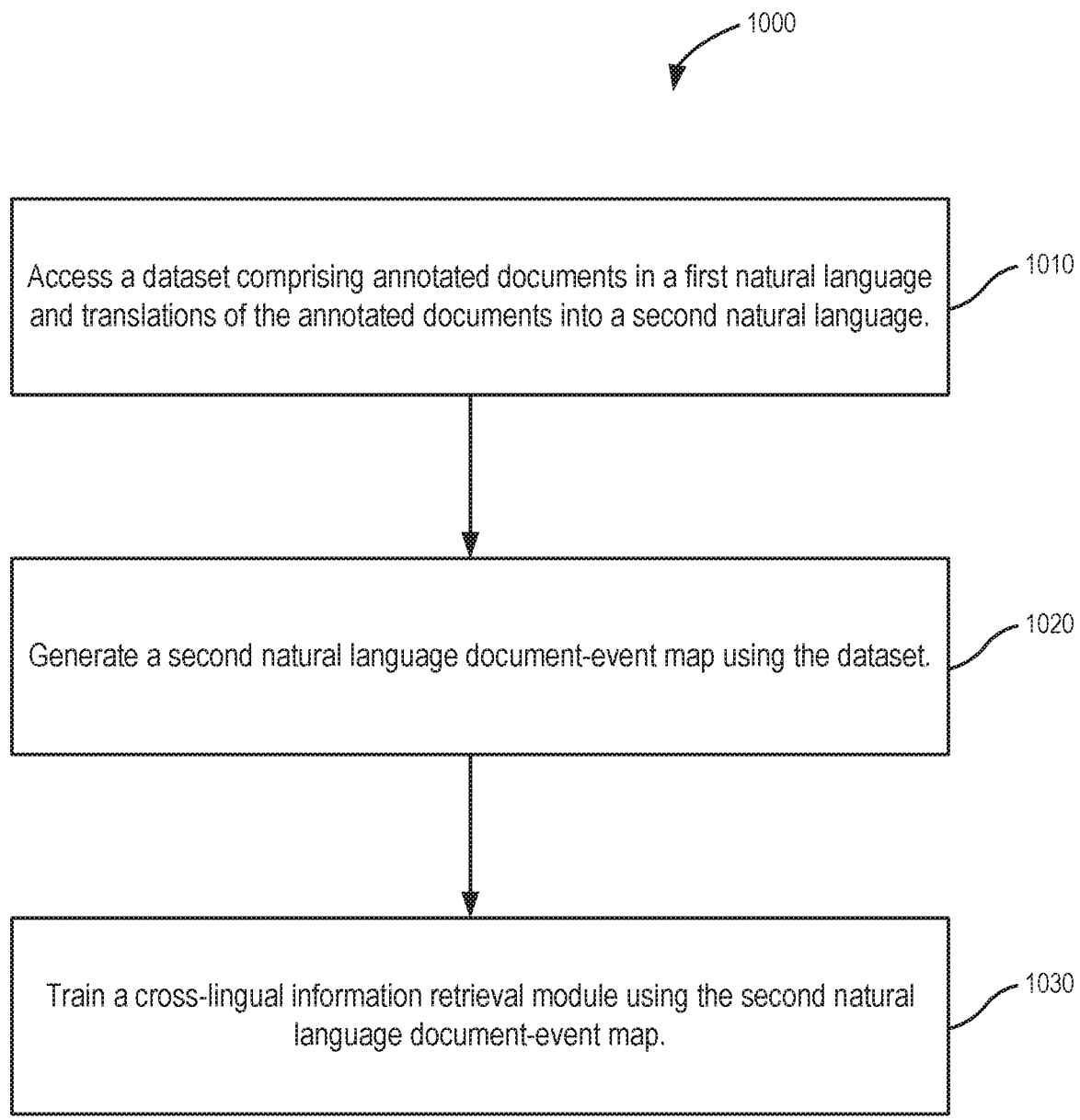
FIG. 10 is a flow chart of a method for training a cross-lingual information retrieval module, in accordance with some embodiments.

FIG. 10 is a flow chart of a method 1000 for training a cross-lingual information retrieval module, in accordance with some embodiments. The method 1000 may be performed at a training computing machine.

At operation 1010, a training computing machine accesses a dataset (e.g., training dataset 700) comprising annotated documents in a first natural language and translations of the annotated documents into a second natural language. Each annotated document in the first natural language is annotated with one or more events. The second natural language is different from the first natural language.

At operation 1020, the training computing machine generates a second natural language document-event map using the dataset. The second natural language document-event map maps, to each translation of each annotated document into the second natural language, the event(s) with which the annotated document is annotated.

At operation 1030, the training computing machine trains a cross-lingual information retrieval module using the second natural language document-event map. The cross-lingual information retrieval module is trained to associate a new document in the second natural language to event(s). The training computing machine provides an output representing the trained cross-lingual information retrieval module. The trained cross-lingual information retrieval module may be provided to an inference computing machine for inference thereat. In some aspects, the cross-lingual information retrieval module has a feature vector comprising text in the second natural language. In some cases, the cross-lingual information retrieval module comprises a deep neural network having an input layer, a plurality of hidden layers, and an output layer. Each of the input layer and the plurality of hidden layers comprises a plurality of neurons. The training may be done using any neural network training technique.

Figure 11:
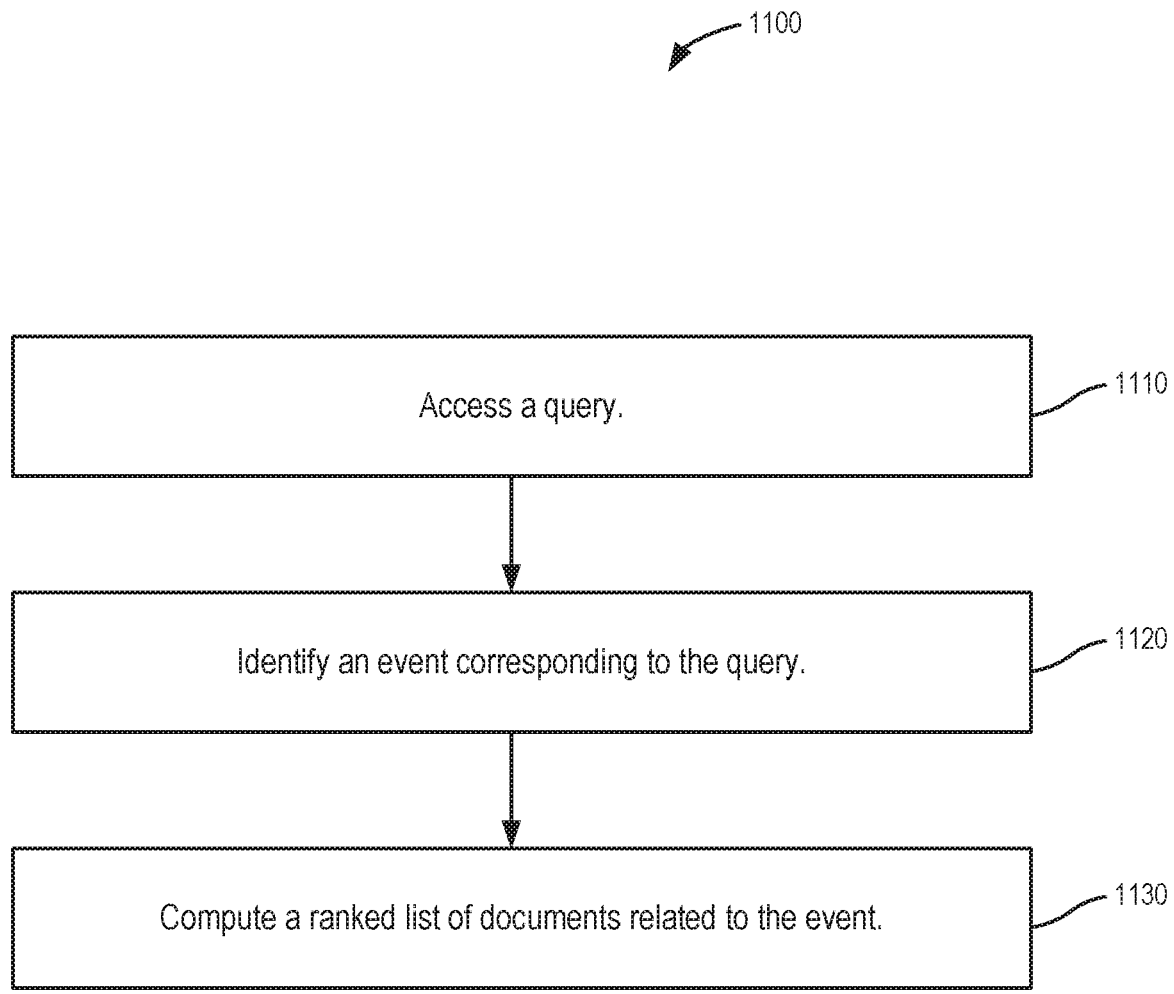
FIG. 11 is a flow chart of a search method, in accordance with some embodiments.

FIG. 11 is a flow chart of a search method 1100, in accordance with some embodiments. The method 1100 may be performed at the inference computing machine, which may be the same as or different from the training computing machine.

At operation 1110, the inference computing machine accesses a query in the first natural language (e.g., English).

The query may be provided by a user searching for information. For example the user may type, "recipe for Teriyaki chicken," in English if he/she is interested in learning how to prepare Teriyaki chicken.

At operation 1120, the inference computing machine identifies an event corresponding to the query. The inference computing machine may identify the event by identifying trigger word(s) and argument(s) for the event in the text of the query. In the above example, the event may be cooking (based on the trigger word "recipe") and the argument(s) may include the food being cooked—"Teriyaki chicken."

At operation 1130, the inference computing machine computes, using the trained (e.g., at the training computing machine using the method 1000) cross-lingual information retrieval module, a ranked list of documents in the second natural language (e.g., Chinese) that are related to the event. At least a portion of documents in the ranked list are selected from a collection of documents in the second natural language that are not annotated with events. The cross-lingual information retrieval module is trained using a dataset (e.g., training dataset 700) comprising annotated documents in the first natural language and translations of the annotated documents into the second natural language. Each annotated document is annotated with one or more events. The inference computing machine may provide an output representing at least a portion of the ranked list of documents in the second natural language.

As a result of the above technique, an English speaking user may search for "recipe for Teriyaki chicken" in English and receive, as search results, Chinese language document(s) relevant to the cooking Teriyaki chicken event that have not been previously translated into English. The user may then machine translate one or more of the document(s) into English in order to learn the information contained therein. Alternatively, if the user can read in both English and Chinese, he/she can read the Chinese language document(s) directly.

In some cases, the query is not translated from the first natural language into the second natural language. In some cases, the ranked list of documents in the second natural language comprises at least one document for which a translation into the first natural language is not stored.

Although an embodiment has been described with reference to specific example embodiments, it will be evident that various modifications and changes may be made to these embodiments without departing from the broader spirit and scope of the present disclosure. Accordingly, the specification and drawings are to be regarded in an illustrative rather than a restrictive sense. The accompanying drawings that form a part hereof show, by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In this document, the terms "including" and "in which" are used as the plain-English equivalents of the respective terms "comprising" and "wherein." Also, in the following claims, the terms "including" and "comprising" are open-ended, that is, a system, user equipment (UE), article, composition, formulation, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

The Abstract of the Disclosure is provided to comply with 37 C.F.R. § 1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment.

What is claimed is:

1. A cross-lingual search apparatus, the apparatus comprising:
   processing circuitry and memory; the processing circuitry to:
   access a query in a first natural language;
   identify an event corresponding to the query, wherein the event is represented, in the first natural language, using a least one trigger word and at least one argument;
   compute, using a cross-lingual information retrieval module and without translating the query or the event corresponding to the query into a second natural language, a ranked list of documents in the second natural language that are related to the event, wherein at least a portion of documents in the ranked list are selected from a collection of documents in the second natural language that are not annotated with events, wherein the cross-lingual information retrieval module is trained using a dataset comprising annotated documents in the first natural language and translations of the annotated documents into the second natural language, wherein each annotated document in the first natural language is annotated with one or more events, wherein the dataset is generated by propagating the one or more events from a given annotated document in the first natural language to a translation of the given annotated document into the second natural language; and
   provide an output representing at least a portion of the ranked list of documents in the second natural language, wherein the second natural language is different from the first natural language.

2. The apparatus of claim 1, wherein the ranked list of documents in the second natural language comprises at least one document for which a translation into the first natural language is not stored.

3. The apparatus of claim 1, wherein the cross-lingual information retrieval module comprises a deep neural network having an input layer, a plurality of hidden layers, and an output layer, and wherein each of the input layer and the plurality of hidden layers comprises a plurality of neurons.

4. The apparatus of claim 1, wherein training the cross-lingual information retrieval module comprises:
accessing the dataset comprising the annotated documents in the first natural language and the translations of the annotated documents into the second natural language;
generating a second natural language document-event map by mapping, to each translation of each annotated document into the second natural language, the one or more events with which the annotated document in the first natural language is annotated; and
training, using a neural network training technique, the cross-lingual information retrieval module to associate a new document in the second natural language to at least one event using the second natural language document-event map.

5. The apparatus of claim 1, wherein the cross-lingual information retrieval module has a feature vector comprising text in the second natural language.

6. A training apparatus, the apparatus comprising:
processing circuitry and memory; the processing circuitry to:
access a dataset comprising annotated documents in a first natural language and translations of the annotated documents into a second natural language, wherein each annotated document in the first natural language is annotated with one or more events, wherein the second natural language is different from the first natural language, wherein each of the one or more events event is represented, in the first natural language, using a least one trigger word and at least one argument;
generate a second natural language document-event map by mapping, to each translation of each annotated document into the second natural language, the one or more events with which the annotated document in the first natural language is annotated; and
train, using a neural network training technique, a cross-lingual information retrieval module to associate a new document in the second natural language to at least one event using the second natural language document-event map; and
provide an output representing the trained cross-lingual information retrieval module.

7. The apparatus of claim 6, wherein the cross-lingual information retrieval module has a feature vector comprising text in the second natural language.

8. The apparatus of claim 6, wherein the cross-lingual information retrieval module comprises a deep neural network having an input layer, a plurality of hidden layers, and an output layer, and wherein each of the input layer and the plurality of hidden layers comprises a plurality of neurons.

9. A non-transitory machine-readable medium storing instructions which, when executed by processing circuitry of one or more machines, cause the processing circuitry to:
access a query in a first natural language;
identify an event corresponding to the query, wherein the event is represented, in the first natural language, using a least one trigger word and at least one argument;
compute, using a cross-lingual information retrieval module and without translating the query or the event corresponding to the query into a second natural language, a ranked list of documents in the second natural language that are related to the event, wherein at least a portion of documents in the ranked list are selected from a collection of documents in the second natural language that are not annotated with events, wherein the cross-lingual information retrieval module is trained using a dataset comprising annotated documents in the first natural language and translations of the annotated documents into the second natural language, wherein each annotated document in the first natural language is annotated with one or more events, wherein the dataset is generated by propagating the one or more events from a given annotated document in the first natural language to a translation of the given annotated document into the second natural language; and
provide an output representing at least a portion of the ranked list of documents in the second natural language, wherein the second natural language is different from the first natural language.

10. The machine-readable medium of claim 9, wherein the ranked list of documents in the second natural language comprises at least one document for which a translation into the first natural language is not stored.

11. The machine-readable medium of claim 9, wherein the cross-lingual information retrieval module comprises a deep neural network having an input layer, a plurality of hidden layers, and an output layer, and wherein each of the input layer and the plurality of hidden layers comprises a plurality of neurons.

12. The machine-readable medium of claim 9, wherein training the cross-lingual information retrieval module comprises:
accessing the dataset comprising the annotated documents in the first natural language and the translations of the annotated documents into the second natural language;
generating a second natural language document-event map by mapping, to each translation of each annotated document into the second natural language, the one or more events with which the annotated document in the first natural language is annotated; and
training, using a neural network training technique, the cross-lingual information retrieval module to associate a new document in the second natural language to at least one event using the second natural language document-event map.

13. The machine-readable medium of claim 9, wherein the cross-lingual information retrieval module has a feature vector comprising text in the second natural language.

14. A cross-lingual search method, the method comprising:
accessing a query in a first natural language;
identifying an event corresponding to the query, wherein the event is represented, in the first natural language, using a least one trigger word and at least one argument;
computing, using a cross-lingual information retrieval module and without translating the query or the event corresponding to the query into a second natural language, a ranked list of documents in the second natural language that are related to the event, wherein at least a portion of documents in the ranked list are selected from a collection of documents in the second natural language that are not annotated with events, wherein the cross-lingual information retrieval module is trained using a dataset comprising annotated documents in the first natural language and translations of the annotated documents into the second natural language, wherein each annotated document in the first natural language is annotated with one or more events, wherein the dataset is generated by propagating the one or more events from a given annotated document in the first natural language to a translation of the given annotated document into the second natural language; and providing an output representing at least a portion of the ranked list of documents in the second natural language, wherein the second natural language is different from the first natural language.

15. The method of claim 14, wherein the ranked list of documents in the second natural language comprises at least one document for which a translation into the first natural language is not stored.

16. The method of claim 14, wherein the cross-lingual information retrieval module comprises a deep neural network having an input layer, a plurality of hidden layers, and an output layer, and wherein each of the input layer and the plurality of hidden layers comprises a plurality of neurons.

17. The method of claim 9, wherein training the cross-lingual information retrieval module comprises:
accessing the dataset comprising the annotated documents in the first natural language and the translations of the annotated documents into the second natural language;
generating a second natural language document-event map by mapping, to each translation of each annotated document into the second natural language, the one or more events with which the annotated document in the first natural language is annotated; and
training, using a neural network training technique, the cross-lingual information retrieval module to associate a new document in the second natural language to at least one event using the second natural language document-event map.

* * * * *

UNITED STATES PATENT AND TRADEMARK OFFICE
CERTIFICATE OF CORRECTION

| | |
|---|---|
| PATENT NO. | : 11,531,824 B2 |
| APPLICATION NO. | : 16/415988 |
| DATED | : December 20, 2022 |
| INVENTOR(S) | : Min et al. |

It is certified that error appears in the above-identified patent and that said Letters Patent is hereby corrected as shown below:

In the Specification

In Column 7, Line 37, delete "$f^{-1}(x)$," and insert --$f^{-1}(x)$,-- therefor In the Claims In Column 20, Line 6, in Claim 17, delete "claim 9," and insert --claim 14,-- therefor Signed and Sealed this
Twenty-eighth Day of November, 2023

Katherine Kelly Vidal
*Director of the United States Patent and Trademark Office*